(12) United States Patent
Kawamura

(10) Patent No.: US 7,328,673 B2
(45) Date of Patent: *Feb. 12, 2008

(54) VALVE TIMING CORRECTION CONTROL APPARATUS AND METHOD FOR AN INTERNAL COMBUSTION ENGINE

(75) Inventor: Katsuhiko Kawamura, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 413 days.

This patent is subject to a terminal disclaimer.

(21) Appl. No.: 10/452,453

(22) Filed: Jun. 3, 2003

(65) Prior Publication Data

US 2005/0188929 A1 Sep. 1, 2005

(30) Foreign Application Priority Data

Jul. 25, 2002 (JP) ............................. 2002-215971

(51) Int. Cl.
*F01L 1/34* (2006.01)
(52) U.S. Cl. ............... 123/90.15; 123/703; 123/672; 123/691; 123/692
(58) Field of Classification Search ........... 123/90.11, 123/90.12–90.18, 90.31, 90.15, 90.17, 691, 123/692; 74/568 R; 464/1, 2, 160; 92/121, 92/122

See application file for complete search history.

(56) References Cited

U.S. PATENT DOCUMENTS

| | | |
|---|---|---|
| 5,115,782 A | 5/1992 | Klinke et al. |
| 5,377,654 A | 1/1995 | LoRusso et al. |
| 5,421,296 A * | 6/1995 | Hitomi et al. ......... 123/184.53 |
| 6,109,224 A | 8/2000 | Morikawa et al. |
| 6,324,835 B1 | 12/2001 | Surnilla et al. |
| 6,519,933 B2 * | 2/2003 | Ogiso et al. .................. 60/285 |
| 6,594,987 B2 * | 7/2003 | Uranishi ...................... 60/277 |
| 6,792,901 B2 * | 9/2004 | Sugiyama et al. ....... 123/90.15 |
| 6,837,231 B1 * | 1/2005 | Herrin ........................ 123/684 |

FOREIGN PATENT DOCUMENTS

| | | |
|---|---|---|
| EP | 1 267 058 A2 | 12/2002 |
| JP | 6-10747 A | 1/1994 |
| JP | 6-213044 (A) | 8/1994 |
| JP | 7-224746 A | 8/1995 |
| JP | 8-177433 (A) | 7/1996 |
| JP | 8-338209 A | 12/1996 |
| JP | 10-141097 (A) | 5/1998 |
| JP | 11-159356 (A) | 6/1999 |
| JP | 2000-3371863 (A) | 12/2000 |
| JP | 2001-280167 A | 10/2001 |
| JP | 2001-295686 (A) | 10/2001 |
| JP | 2002-89303 A | 3/2002 |

* cited by examiner

*Primary Examiner*—Thomas Denion
*Assistant Examiner*—Kyle M. Riddle
(74) *Attorney, Agent, or Firm*—Foley & Lardner LLP

(57) ABSTRACT

A valve timing correction control apparatus for an internal combustion engine is provided. The engine includes a plurality of banks and variable valve operating mechanisms disposed at the respective banks for variably controlling valve timings of intake valves separately at the respective banks. The valve timing correction control apparatus comprises air/fuel ratio sensors provided to exhaust systems of the respective banks, and a control unit that corrects the valve timings of the intake valves at the respective banks in accordance with deviations of air/fuel ratios detected by the respective air/fuel ratio sensors. A valve timing correction control method is also provided.

3 Claims, 4 Drawing Sheets

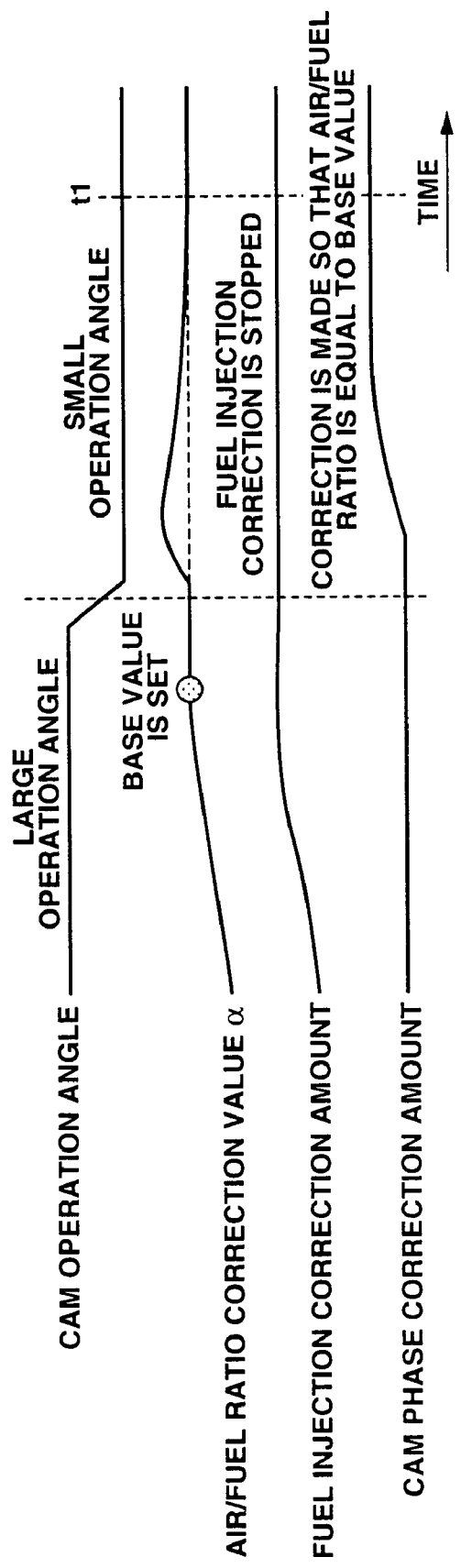

VALVE TIMING CORRECTION CONTROL APPARATUS AND METHOD FOR AN INTERNAL COMBUSTION ENGINE

BACKGROUND OF THE INVENTION

The present invention relates to an internal combustion engine having a plurality of banks such as a V-type engine and a horizontally opposed engine and variable valve operating mechanisms disposed at the respective banks for controlling the opening and closing timings of intake valves, and more particularly to a valve timing correction control apparatus and method for correcting a difference in valve-lift characteristics between the variable valve operating mechanisms disposed at the respective banks.

Various variable valve operating mechanisms capable of attaining valve lift characteristics suited to engine operating conditions have heretofore been proposed. For example, a variable valve operating mechanism constituted by combining a lift and operation angle varying mechanism capable of varying a lift and operation angle of an intake valve continuously with a phase varying mechanism capable of varying a maximum lift phase of an intake valve is disclosed in Japanese Patent provisional publication No. 2001-280167 that is assigned to the same assignee of this application.

Also disclosed in Japanese Patent provisional publication No. 8-338209 is a valve operating mechanism for a V-type engine having two banks, wherein for the purpose of compensating for a difference in the valve timing between the banks due to loosening of a single timing belt for driving intake and exhaust valves of the both banks, the phase of a camshaft at one bank is varied beforehand by an angle corresponding to the difference of the valve timing due to the loosening of the timing belt.

SUMMARY OF THE INVENTION

In case the variable valve operating mechanism of the type described above is used in an engine having a plurality of banks such as a V-type engine and a horizontally opposed engine, the variable valve operating mechanisms are provided to the respective banks. This may possibly cause a difference in the valve-lift characteristics between the variable valve operating mechanisms disposed at the respective banks, thus causing a difference in the intake air amount of the cylinders between the banks so that a richer air-fuel ratio is caused at one bank and a leaner air-fuel ratio is caused at the other bank and therefore an unstable combustion is caused. Particularly, in the variable valve operating mechanism capable of varying the operation angle of the intake valve, a small difference of the valve timing that is caused when the operation angle is controlled to be small thereby allowing the intake valve closing timing to be positioned adjacent the midpoint between the top dead center and the bottom dead center will cause a large variation of the amount of intake air drawn into the cylinder. Generally, an airflow meter is common to the intake systems of the both banks and detects the intake air amount of the entire engine, so that the air-fuel ratios differ between the both banks if no countermeasure is made thereto. In the meantime, if air-fuel ratio sensors are provided to the exhaust systems of the respective banks so as to feedback control the fuel injection amounts separately at each bank, the same air-fuel ratio can be obtained at the respective banks but the torques generated at the respective banks differ from each other, thus causing a variation of torque and therefore vibrations of the engine.

Further, the technique disclosed by the Japanese patent provisional publication No. 8-338209 can not provide any countermeasure to such a difference in the valve-lift characteristics between the variable valve operating mechanisms disposed at the respective banks.

It is accordingly an object of the present invention to provide a valve timing correction control apparatus and method for an internal combustion engine that can solve the above noted problem.

To achieve the above object, there is provided according to an aspect of the present invention a valve timing correction control apparatus for an internal combustion engine having a plurality of banks and variable valve operating mechanisms disposed at the respective banks for variably controlling valve timings of intake valves separately at the respective banks, the valve timing correction control apparatus comprising air/fuel ratio sensors provided to exhaust systems of the respective banks, and a control unit that corrects the valve timings of the intake valves at the respective banks in accordance with deviations of air/fuel ratios detected by the respective air/fuel ratio sensors.

According to another aspect of the present invention, there is provided a valve timing correction control method for an internal combustion engine having a plurality of banks and variable valve operating mechanisms disposed at the respective banks for variably controlling valve timings of intake valves separately at the respective banks, the method comprising providing air/fuel ratio sensors to exhaust systems of the respective banks, and correcting the valve timings of the intake valves at the respective banks in accordance with deviations of air/fuel ratios detected by the respective air/fuel ratio sensors.

BRIEF DESCRIPTION OF THE DRAWINGS

FIG. 4 is a time chart for illustrating a feedback correction after an operation angle is changed from large to small;

DESCRIPTION OF THE PREFERRED EMBODIMENT

Figure 1:
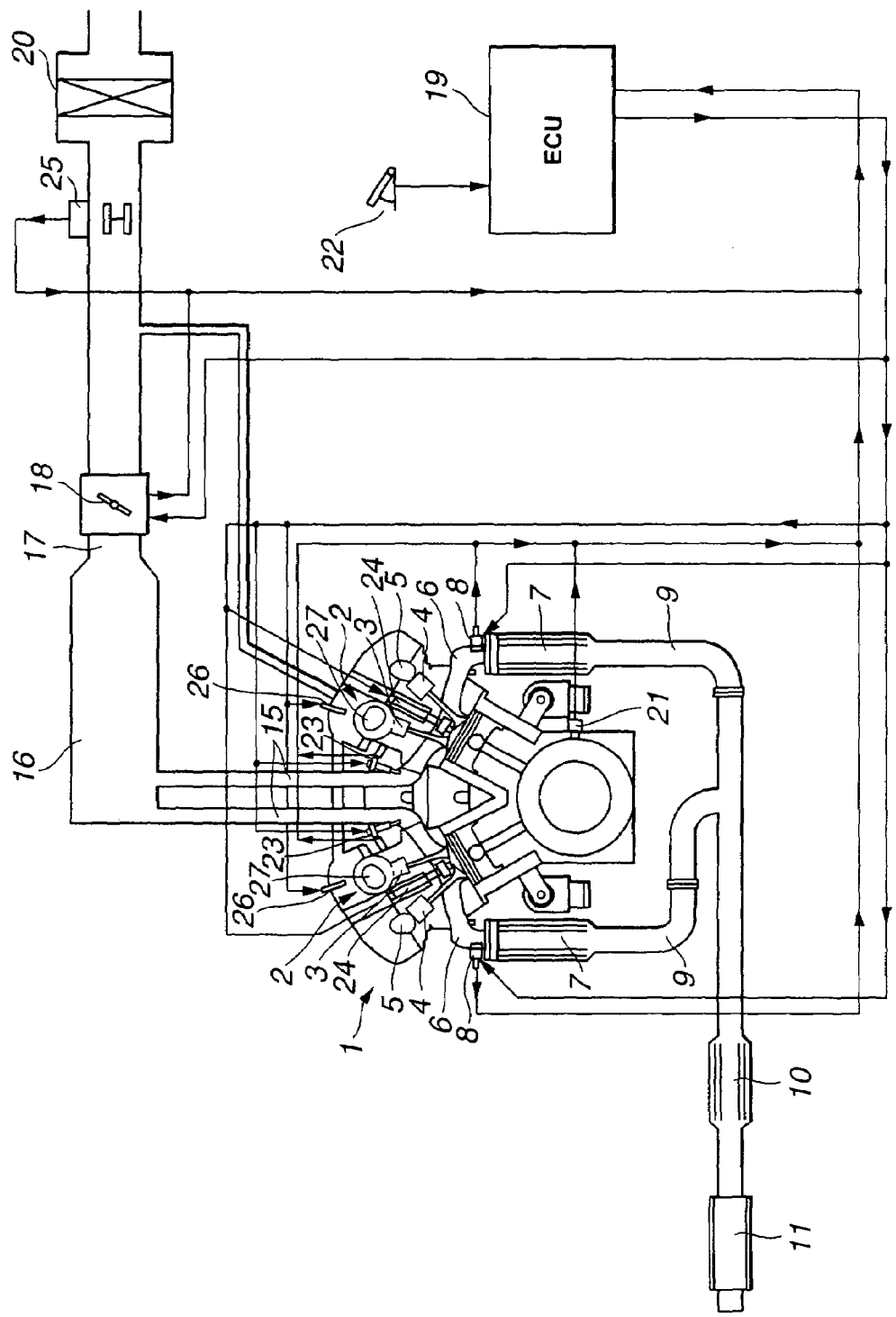
FIG. 1 is a schematic view of a V-type internal combustion engine having a valve timing correction control apparatus according to an embodiment of the present invention.

Referring first to FIG. 1, a V-type internal combustion engine is generally indicated by 1 and includes variable valve operating mechanisms 2 disposed at respective banks for controlling valve timings of intake valve 3 separately at the respective banks. Engine 1 also includes valve operating mechanisms (no numeral) disposed at the respective banks for operating exhaust valves 4. The valve operating mechanisms for exhaust valves 4 are of the direct-drive type so as to drive exhaust valves 4 directly by exhaust camshafts 5 and therefore has valve lift characteristics that are always constant.

Exhaust manifolds 6 for the respective banks are connected to catalytic converters 7. Upstream of catalytic converters 7 are disposed air/fuel ratio sensors 8 for detecting the air/fuel ratio of the exhaust gas. Exhaust passages 9 for the respective banks are joined at the downstream sides of catalytic converters 7 to form a single passage that is provided with second catalytic converter 10 and silencer 11 at the downstream portion thereof.

To an intake port of each cylinder is connected branch passage 15. Six branch passages 15 are connected at upstream ends thereof to collector 16. To an end of collector 16 is connected intake inlet passage 17 to which is provided electronically controlled throttle valve 18. Electronically controlled throttle valve 18 is provided with an actuator made up of an electric motor so that its opening degree is controlled in response to a control signal supplied thereto from engine control unit 19. In the meantime, electronically controlled throttle valve 18 is provided with a sensor (not shown) for detecting an actual opening degree of throttle valve 18 as an integral unit, and on the basis of a detection signal of the sensor a throttle valve opening degree is closed-loop controlled to a target opening degree. Further, upstream of throttle valve 18 is disposed airflow meter 25 for detecting an intake air amount, and upstream of air flow meter 25 is disposed air cleaner 20.

Further, to a crank shaft (no numeral) is provided crank angle sensor 21 for detecting an engine speed and a crank angle position. Further, accelerator opening degree sensor 22 is provided for detecting an opening degree (depression amount) of an accelerator pedal (no numeral) operated by a vehicle driver. Based on those signals, engine control unit 19 controls a fuel injection amount and injection timing of fuel injector 23, an ignition timing of spark plug 24, valve-lift characteristics of variable valve operating mechanism 2, an opening degree of throttle valve 18, etc.

Variable valve operating mechanism 2 is constituted by combining a lift and operation angle varying mechanism that varies the lift and operation angle of intake valve 3 in two stages with a phase control mechanism that varies, i.e., advances or retards the maximum lift phase (phase relative to crankshaft) of intake valve 3 continuously.

The above-described lift and operation angle varying mechanism, as disclosed in Japanese patent provisional publication Nos. 7-224746 and 6-10747, includes a high-speed cam for effecting a large lift and large operation angle, a low-speed cam for effecting a small lift and small operation angle, the high-speed cam and low-speed cam being provided to intake cam shaft 27, a main rocker arm that operates in accordance with operation of the low-speed camshaft and an auxiliary rocker arm that operates in accordance with operation of the high-speed cam. The main rocker arm and auxiliary rocker arm that push intake valve 3 are engaged with or disengaged from each other by hydraulic pressure. That is, in a state where the both are engaged with each other, a large operation angle and large lift are obtained by the high-speed cam. On the contrary, in a state where the both are disengaged from each other, the auxiliary rocker arm is allowed to swing freely so that small operation angle and small lift characteristics are effected by the low-speed cam.

Further, the above-described phase varying mechanism, as disclosed in Japanese patent publication Nos. 2001-280167 and 2002-89303, includes a sprocket that is provided to a front end portion of intake cam shaft 27 and drivingly connected to the crankshaft by way of a timing chain or timing sprocket so as to rotate in timed relation to the crankshaft, and a phase control actuator that causes relative rotation of the sprocket and the intake camshaft within a predetermined angular range. The above-described phase control actuator is made up of, for example, hydraulic or electromagnetic rotary actuator and is controlled by a control signal supplied thereto from engine control unit 19. By the phase control mechanism, the curve itself representative of the lift characteristics is not varied but is advanced or retarded in its entirety. This variation can be obtained continuously. The controlled condition of the phase varying mechanism is detected by cam angle sensor 26 that is responsive to the rotational position of intake cam shaft 27.

In the meantime, in the above-described Japanese patent provisional publication Nos. 2001-280167 and 2002-89303 is disclosed a lift and operation angle varying mechanism capable of varying a lift and operation angle continuously. In this connection, the present invention can be applied to a variable valve operating mechanism that is capable of varying the lift and operation angle continuously.

In V-type internal combustion engine 1, hydraulic control circuits of variable valve operating mechanisms 2 are disposed separately at the respective banks. Namely, at the respective banks are disposed hydraulic operation angle control valves that control the hydraulic pressures to be supplied to hydraulic mechanisms that perform engagement or disengagement of the main and auxiliary rocker arms of the lift and operation angle varying mechanisms and that are controlled by the control signals supplied thereto from engine control unit 19. Further, in case a hydraulic phase control actuator is used as a phase varying mechanism, hydraulic phase control valves that control the hydraulic pressures to be supplied to the actuators are disposed at the respective banks and feedback controlled by engine control unit 19 on the basis of the detection signals of cam angle sensor 26. In the meantime, in case an electromagnetic actuator is used for phase control, it is also controlled based on the detection signals of respective cam angle sensors 26.

Figure 2:
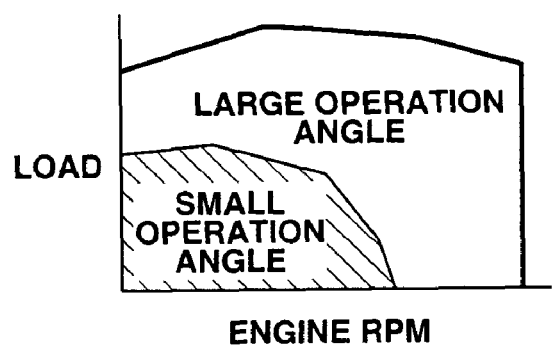
FIG. 2 is a characteristic view showing an operation range of a small operation angle and an operation range of a large operation angle of a variable valve operating mechanism of the engine of FIG. 1.
Figure 3A:
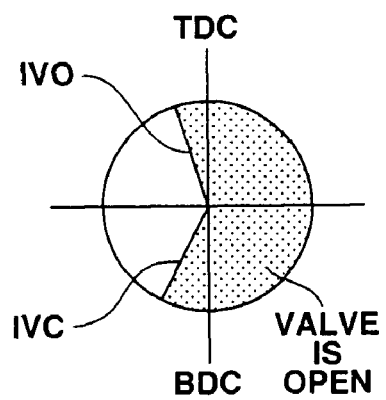
FIG. 3A is a characteristic view showing an example of a valve timing at the time of a large operation angle.
Figure 3B:
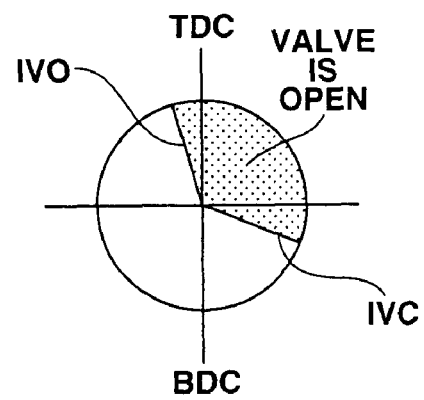
FIG. 3B is a characteristic view showing an example of a valve timing at the time of a small operation angle.

FIG. 2 shows the lift and operation angle characteristics effected by the above-described lift and operation angle varying mechanism. As shown in FIG. 2, a small lift and small operation angle are effected by a low-speed and low-load range and a large lift and large operation angle are effected by a high-speed and high-load range. Further, FIG. 3A shows an example of a valve timing of intake valve 4 in case the operation angle is large, and FIG. 3B shows an example of a valve timing of intake valve 4 in case the operation angle is small. In this connection, in case the operation angle is small, the intake valve closing timing (IVC) is advanced considerably from the bottom dead center and is positioned adjacent a middle point between the top dead center and the bottom dead center. By such a valve timing, an actual intake stroke is determined based upon the intake valve closing timing. Furthermore, as will be apparent from the relation of the trigonometric function, an angular difference of the intake valve closing timing causes a large variation of the intake stroke. Namely, the actual amounts of intake air to be supplied to the cylinders of the respective banks are liable to differ from each other. In the meantime, the difference in the valve-lift characteristics between the variable valve operating mechanisms of the respective banks mainly depends upon a variation in the position at which each of cam angle sensors 26 is installed on engine 1.

Thus, according to the present invention, the difference in the valve-lift characteristics between the variable valve operating mechanisms of the respective banks is corrected based upon the air/fuel ratios of the respective banks that are detected by air/fuel ratio sensors 8.

FIG. 4 is a time chart for illustrating a correction control according to the present invention and particularly shows variations of air/fuel ratio correction value, etc. at one bank. Firstly, the fuel injection amount is feedback controlled based upon the detection signal from air/fuel ratio sensor 8 so that when the operation angle is large, the air/fuel ratio is made equal to the stoichiometric air/fuel ratio. Namely, as is known to a person skilled in the art, necessary air/fuel ratio correction amount α is calculated based on the detection signal of air/fuel ratio sensor 8, and air/fuel ratio correction amount α is multiplied by a base fuel injection amount that is determined from an intake air amount detected by airflow meter 25 and an engine speed for thereby obtaining a fuel injection amount. The "fuel injection correction amount" indicates the fuel amount that is added to or subtracted from the base fuel injection amount on the basis of air/fuel ratio correction amount α. In the meantime, air/fuel ratio sensor 8 can be either of an oxygen sensor that can only detect whether the air/fuel ratio is rich or lean or a universal or wide range air/fuel ratio sensor that can produce an output that changes linearly in proportion to a variation of an air/fuel ratio. In case the oxygen sensor is used, the air/fuel ratio correction amount α is obtained by a PI control (proportional control and integral control) based on a reversal of the output from rich to lean or vise versa. In this instance, the characteristic curve of "air/fuel ratio correction amount α" shown in FIG. 4 indicates an average variation of the same. In this manner, when the engine is operated under a large operation angle and under a road-load condition (i.e., under a constant torque and constant engine speed), the air/fuel ratio correction amount α is read in as a base air/fuel ratio. The air/fuel ratio correction amount α corresponding to the base air/fuel ratio is naturally a value in close proximity to "1". As is known to a person skilled in the art, the value of the air/fuel ratio correction amount α corresponds to a deviation of the air/fuel ratio that is not corrected by a feedback control from the stoichiometric air/fuel ratio. For example, a variation of the performance characteristics of fuel injector 23 and a variation of the performance characteristics of air/fuel ratio sensor 8 are reflected in the air/fuel ratio correction amount α.

Then, when the engine operating condition is varied so as to make the operation angle small, the feedback control of the fuel injection amount based on the detection of air/fuel ratio sensor 8 is stopped, and the open-loop control of the fuel injection amount is started. However, it is desirable to continue the correction of the fuel injection amount based on the above-described base air/fuel ratio. Under this condition, the valve timing of the variable valve operating mechanism is feedback controlled based on the detection of air/fuel ratio sensor 8. More specifically, if the detected air/fuel ratio is leaner than the base air/fuel ratio, the phase varying mechanism is controlled so as to advance the phase such that the actual intake stroke becomes shorter. On the contrary, when the detected air/fuel ratio is richer than the base air/fuel ratio, the phase varying mechanism is controlled so as to retard the phase such that the actual intake stroke becomes longer, i.e., the intake valve closing timing goes closer to the bottom dead center. In the example shown in FIG. 4, when the operation angle is changed to be small, the intake air amount becomes excessively large and air/fuel ratio correction amount α becomes larger than the value equated to the base air/fuel ratio. However, based upon this, the intake valve closing timing is corrected so as to advance. As a result, the air/fuel ratio correction amount α goes closer to the base air/fuel ratio gradually and finally becomes equal to the same. The phase correction amount, i.e., the cam phase correction amount at the time the air/fuel ratio correction amount α becomes equal to the base air/fuel ratio is considered to correspond to a deviation of the performance characteristics of variable valve operating mechanism 2 at that bank and generally considered to correspond to a variation in the position at which cam angle sensor 26 is installed on engine 1. Thus, at the time t1 when the air/fuel ratio correction amount α becomes equal to the base air/fuel ratio, the cam phase correction amount is learned and is used in the control performed thereafter. For example, by adding beforehand the learning value to the target value of the phase varying mechanism, it becomes possible to control the valve-lift characteristics obtained at that bank irrespective of a small operation angle or a large operation angle. Particularly, by making the air/fuel ratio correction amount α be equal not to the stoichiometric air/fuel ratio but to the base air/fuel ratio, the above-described learning value can be made to reflect the difference in the valve-lift characteristics between variable valve operating mechanisms 2 of the respective banks without being influenced by the difference in the performance characteristics of fuel injector 23 and air/fuel ratio sensor 8 between the banks.

Figure 5:
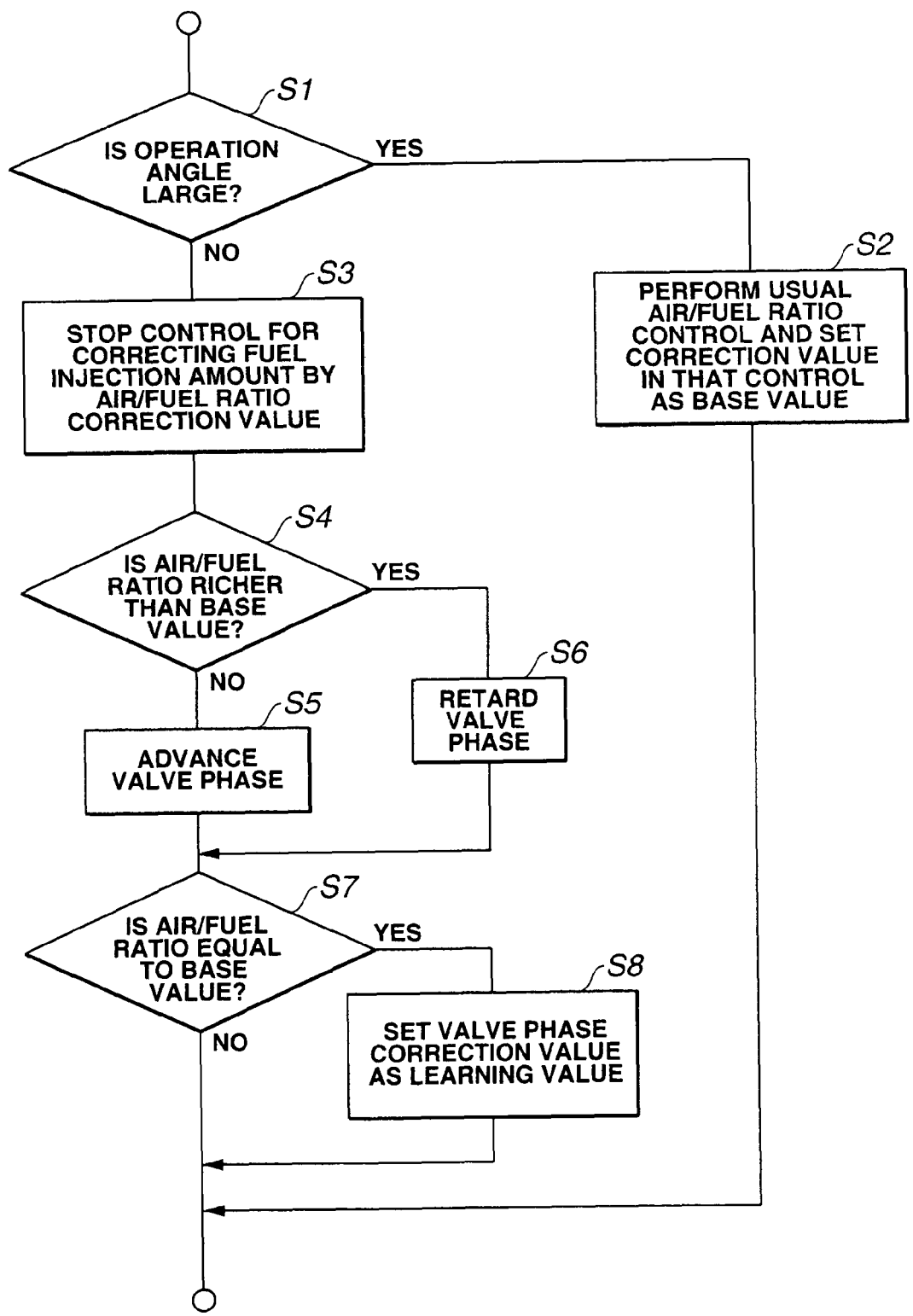
FIG. 5 is a flowchart for showing a feedback correction control performed by the valve timing correction control apparatus of the present invention.

FIG. 5 is a flowchart of the above-described control. Firstly, in step S1, it is determined whether engine 1 is under an operating condition of a large operation angle or a small operation angle, i.e., whether the operation angle is large. When the operation angle is large, the program proceeds to step S2 where a usual air/fuel ratio feedback control is performed and the air/fuel ratio correction value α when the feedback controlled air/fuel ratio converges sufficiently is set as a base value (value equated to base air/fuel ratio).

On the other hand, when the operation angle is small, the program proceeds to step S3 where the air/fuel ratio feedback control is stopped. Then, in step S4, it is determined whether the air/fuel ratio is richer or leaner than the base air/fuel ratio. When the air/fuel ratio is leaner than the base air/fuel ratio, the control proceeds to step S5 where an advance correction of the phase is made. When the air/fuel ratio is leaner than the base air/fuel ratio, the program proceeds to step S6 where a retard correction of the phase is made. Further, in step S7, it is determined whether the air/fuel ratio has become equal to the base air/fuel ratio. When it is determined that the air/fuel ratio has become equal to the base/air fuel ratio, the program proceeds to step S8 where the cam phase correction value at that time is set as a learning value.

In FIGS. 4 and 5, description is made to the feedback correction at one bank only. However, airflow meter 25 measures the total amount of intake air to be supplied to the cylinders of the respective banks, so that if the air/fuel ratio for the cylinders at one bank is judged lean, the air/fuel ratio for the cylinders at the other bank is usually rich. Accordingly, at the respective banks, the above-described feedback corrections are performed in parallel.

The entire contents of Japanese Patent Application P2002-215971(filed Jul. 25, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the above-described feedback correction of the valve timing can of course be performed all the time when the operation angle is small, the feedback control of the fuel injection amount can not be performed during that time. Thus, the feedback correction of the valve timing can be finished at the time when a new learning value is obtained and the feedback control of the air/fuel ratio can be restarted. Further, since the difference of the valve-lift characteristics mostly depends upon an error in installation of cam angle sensors 26, it is not always necessary to perform the feedback correction every time when the operation angle becomes small but the feedback correction can be made at a suitable frequency, e.g., every time when the operation angle is first changed from large to small during one continuous operation of engine 1. The scope of the invention is defined with reference to the following claims.

What is claimed is:

1. A valve timing correction control apparatus for an internal combustion engine having a plurality of banks and variable valve operating mechanisms disposed at the respective banks for variably controlling valve timings of intake valves separately at the respective banks, the valve timing correction control apparatus comprising:
   air/fuel ratio sensors provided to exhaust systems of the respective banks; and
   a control unit configured to correct the valve timings of the intake valves at the respective banks in accordance with deviations of air/fuel ratios detected by the respective air/fuel ratio sensors,
   wherein the control unit is programmed to perform correction of the valve timings when operation angles of the intake valves are controlled so as to be small,
   wherein the control unit is programmed to obtain base air/fuel ratios for the respective banks when the operation angles of the intake valves are controlled so as to be large and perform correction of the valve timings so as to allow the air/fuel ratios for the respective banks to become equal to the base air/fuel ratios, and
   wherein the control unit is programmed to perform retard correction of an intake valve closing timing when the air/fuel ratio is richer than the base air/fuel ratio and perform advance correction of the intake valve closing timing when the air/fuel ratio is leaner than the base air/fuel ratio.

2. A valve timing correction control method for an internal combustion engine having a plurality of banks and variable valve operating mechanisms disposed at the respective banks for variably controlling valve timings of intake valves separately at the respective banks, the method comprising:
   providing air/fuel ratio sensors to exhaust systems of the respective banks; and
   correcting the valve timings of the intake valves at the respective banks in accordance with deviations of air/fuel ratios detected by the respective air/fuel ratio sensors,
   wherein correcting the valve timings of the intake valves comprises performing correction of the valve timings when operation angles of the intake valves are controlled so as be small,
   wherein correcting the valve timings of the intake valves comprises obtaining base air/fuel ratios for the respective banks when the operation angles of the intake valves are controlled so as to be large and performing correction of the valve timings so as to allow the air/fuel ratios for the respective banks to become equal to the base air/fuel ratios, and
   wherein the correcting the valve timings of the intake valves comprises performing retard correction of an intake valve closing timing when the air/fuel ratio is richer than the base air/fuel ratio and performing advance correction of the intake valve closing timing when the air/fuel ratio is leaner than the base air/fuel ratio.

3. A valve timing correction control apparatus for an internal combustion engine having a plurality of banks and variable valve operating mechanisms disposed at the respective banks for variably controlling valve timings of intake valves separately at the respective banks, the valve timing correction control apparatus comprising:
   air/fuel ratio sensors provided to exhaust systems of the respective banks; and
   a control unit that corrects the value timings of the intake valves at the respective banks in accordance with deviations of air/fuel ratios detected by the respective air/fuel ratio sensors,
   wherein the control unit is configured to obtain base air/fuel ratios for the respective banks when the operation angles of the intake valves are controlled so as to be large, wherein the control unit is configured to control a fuel injection amount so as to allow the air/fuel ratios for the respective banks to become equal to the base air/fuel ratios when the operation angles of the intake valves are controlled so as to be large,
   wherein the control unit is configured to control the valve timings of the intake valves of the respective banks on the basis of the air/fuel ratios detected by the respective air/fuel ratio sensors when the operation angles of the intake valves are controlled so as to be small, and
   wherein when the operation angles of the intake valves are controlled so as to be small, the control unit is configured to perform retard correction of an intake valve closing timing when the air/fuel ratio is richer than the base air/fuel ratio and perform advance correction of the intake valve closing timing when the air/fuel ratio is leaner than the base air/fuel ratio.

* * * * *